US012742539B2

(12) United States Patent
Anderson et al.

(10) Patent No.: US 12,742,539 B2
(45) Date of Patent: Sep. 22, 2026

(54) DEVICE FOR INCREASING VISIBILITY OF GUY LINES AT NIGHT

(71) Applicant: Brightz, Ltd., Ottawa Lake, MI (US)

(72) Inventors: Brent Anderson, Ottawa Lake, MI (US); Ronald Finch, Ottawa Lake, MI (US)

(73) Assignee: BRIGHTZ, LTD., Ottawa Lake, MI (US)

(*) Notice: Subject to any disclaimer, the term of this patent is extended or adjusted under 35 U.S.C. 154(b) by 0 days.

(21) Appl. No.: 19/285,168

(22) Filed: Jul. 30, 2025

(65) Prior Publication Data

US 2025/0354678 A1 Nov. 20, 2025

Related U.S. Application Data

(63) Continuation of application No. 18/637,349, filed on Apr. 16, 2024, now Pat. No. 12,398,869, which is a continuation of application No. 17/988,288, filed on Nov. 16, 2022, now Pat. No. 11,988,364, which is a continuation of application No. 17/587,557, filed on Jan. 28, 2022, now Pat. No. 11,530,801.

(Continued)

(51) Int. Cl.

| | |
|---|---|
| ***F21V 21/088*** | (2006.01) |
| ***E04H 15/10*** | (2006.01) |
| ***F21L 4/08*** | (2006.01) |
| ***F21V 23/04*** | (2006.01) |
| *F21Y 115/10* | (2016.01) |

(52) U.S. Cl.

CPC ......... *F21V 21/0885* (2013.01); *E04H 15/10* (2013.01); *F21L 4/08* (2013.01); *F21V 23/0414* (2013.01); *F21Y 2115/10* (2016.08)

(58) Field of Classification Search

CPC .. F21V 21/0885; F21V 23/0414; F21V 33/00; E04H 15/10; F21L 4/08; F21Y 2115/10

See application file for complete search history.

(56) References Cited

U.S. PATENT DOCUMENTS 1,740,982 A 12/1929 Hillier
5,655,830 A * 8/1997 Ruskouski .............. G09F 13/18 362/240

(Continued)

FOREIGN PATENT DOCUMENTS

WO WO-2015120332 A1 * 8/2015 ................ F21L 4/08

*Primary Examiner* — Evan P Dzierzynski

(74) *Attorney, Agent, or Firm* — Vorys, Sater, Seymour and Pease LLP; Rex W. Miller, II

(57) ABSTRACT

Currently disclosed is a device for increasing visibility of a guy line at night. The device includes a housing, a light emitting source, a power source, and an on/off switch. The housing having an internal portion, external portion, and an attachment mechanism located on the external portion of the housing locking in place the housing to the guy line. The light emitting source is located within the housing and powered by the power source. The on/off switch is in contact with the power source providing readily activation of the light emitting source. The attachment mechanism may comprise at least one hook portion and a tensioning mechanism. The tensioning mechanism may comprise at least one offset portion. The tensioning mechanism prevents the device from sliding down the guy line.

21 Claims, 9 Drawing Sheets

Related U.S. Application Data

(60) Provisional application No. 63/143,272, filed on Jan. 29, 2021.

(56) References Cited

U.S. PATENT DOCUMENTS

| | | | | |
|---|---|---|---|---|
| 5,707,135 | A | 1/1998 | Miller, Jr. | |
| 6,353,946 | B1 | 3/2002 | Steiner | |
| 6,758,588 | B2 * | 7/2004 | Hsu | B60Q 1/56 362/582 |
| 7,021,809 | B2 | 4/2006 | Iwasa et al. | |
| 7,410,271 | B1 | 8/2008 | Man | |
| 7,544,082 | B1 | 6/2009 | Halvorsen | |
| 2003/0223247 | A1 | 12/2003 | Karras | |
| 2007/0279902 | A1 | 12/2007 | Kim | |
| 2009/0173455 | A1 | 7/2009 | Hartley | |
| 2012/0140457 | A1 | 6/2012 | McQuade | |
| 2012/0275142 | A1 * | 11/2012 | Lundy | F21L 4/027 362/184 |
| 2013/0298845 | A1 | 11/2013 | Blanchard | |
| 2015/0300607 | A1 * | 10/2015 | Choi | F21K 9/27 362/224 |
| 2016/0033117 | A1 * | 2/2016 | Grigore | F21S 8/02 362/222 |
| 2016/0168815 | A1 | 6/2016 | Kemp | |
| 2017/0138585 | A1 * | 5/2017 | Korenek | F21L 4/00 |
| 2021/0140625 | A1 | 5/2021 | Holliger et al. | |

* cited by examiner

DEVICE FOR INCREASING VISIBILITY OF GUY LINES AT NIGHT

This application is a continuation of and claims priority to U.S. patent application Ser. No. 18/637,349 entitled "Device for Increasing Visibility of Guy Lines at Night" filed Apr. 16, 2024, which is a continuation of and claims priority to U.S. patent application Ser. No. 17/988,288 entitled "Device for Increasing Visibility of Guy Lines at Night" filed Nov. 16, 2022, which is a continuation of and claims priority to U.S. patent application Ser. No. 17/587,557 entitled "Device for Increasing Visibility of Guy Lines at Night" filed Jan. 28, 2022, now issued as U.S. Pat. No. 11,530,801, which claims benefit of U.S. Provisional Patent Application Ser. No. 63/143,272, filed on Jan. 29, 2021, each of which are incorporated by reference in their entirety herein.

BACKGROUND

Most modern tents used in recreational camping are supported with ropes or wires attached to stakes driven into the ground. Said ropes or wires are commonly referred to as guy wires or guy lines. Guy lines are typically taunt angled low to the ground providing support and stability to a freestanding structure, such as a tent. However, guy lines may cause problems when navigating around the tent or other structure as people can trip on the taunt guy lines. This is especially a problem at night, as the stakes and lines around a tent are farther out than the perimeter of the tent itself. Additionally, due to their small size, guy lines are near invisible at night making them hazardous. Therefore, there is a need for a solution for increasing the visibility of guy lines at night to reduce the probability of someone tripping over the lines and potentially becoming injured.

SUMMARY

Currently disclosed is a safety device for increasing visibility of a guy line at night. The device comprises a housing, a light emitting source, a power source, and an on/off switch. The housing comprising an internal portion, external portion, and an attachment mechanism located on the external portion of the housing locking in place the housing to the guy line. The light emitting source is located within the housing and powered by the power source. The on/off switch is in contact with the power source and provides for readily activation of the light emitting source.

The attachment mechanism may comprise of at least one hook portion and a tension mechanism, wherein the tension mechanism comprises at least one offset portion. The at least one hook portion attaches to the guy line. The offset portion pushes the guy line into the hook portion providing tension to the guy line and locking in place the device to the guy line; thus, preventing the device from sliding down the guy line. The device may be held in place at any point along the length of the guy line.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION OF THE DRAWINGS

Figure 1:
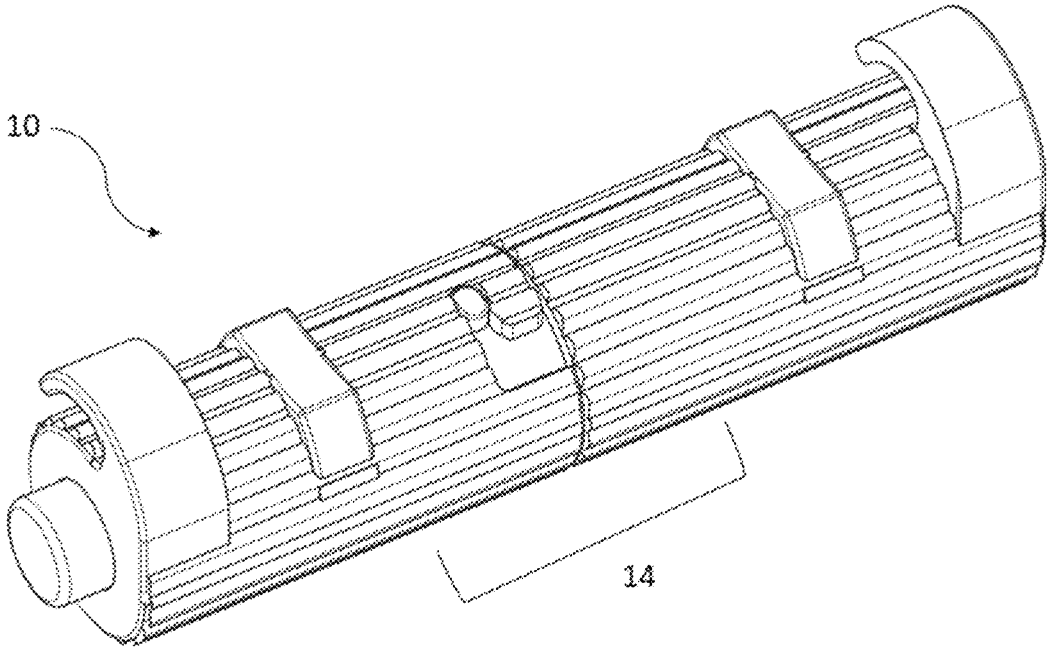
FIG. 1 illustrates a device for increasing visibility of a guy line.
Figure 2:
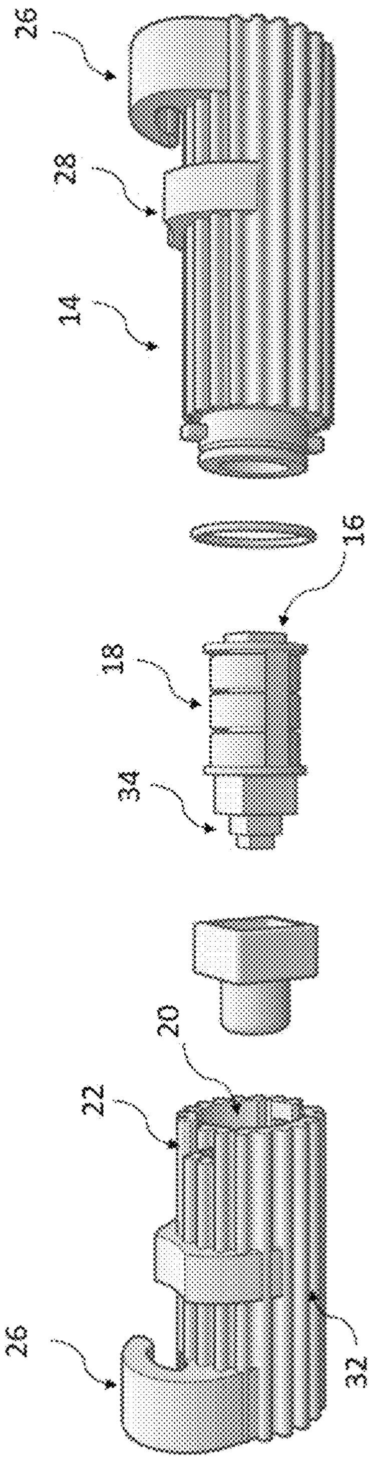
FIG. 2 illustrates an exploded view of a device for increasing visibility of a guy line.

As illustrated in FIGS. 1-9, currently disclosed is a device 10 for increasing visibility of a guy line 12 at night. The device comprises a housing 14, a light emitting source 16, a power source 18, and an on/off switch 34. The housing 14 comprises an internal portion 20, an external portion 22, and an attachment mechanism 24. The attachment mechanism 24 is located on the external portion 22 of the housing. The light emitting source is located within the housing and is powered by the power source. The on/off switch 34 is in contact with the power source 18.

Figure 3:
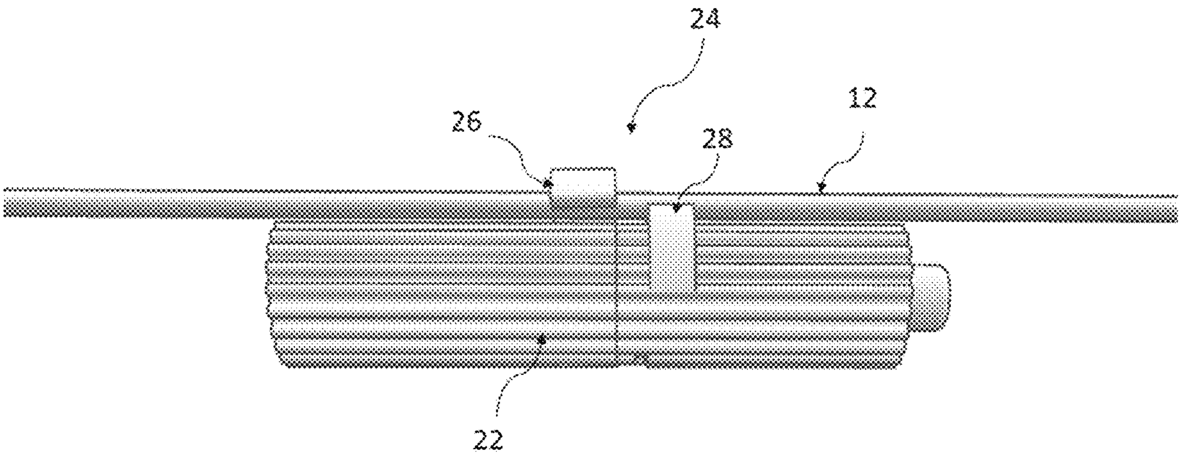
FIG. 3 illustrates a device for increasing visibility of a guy line.
Figure 4:
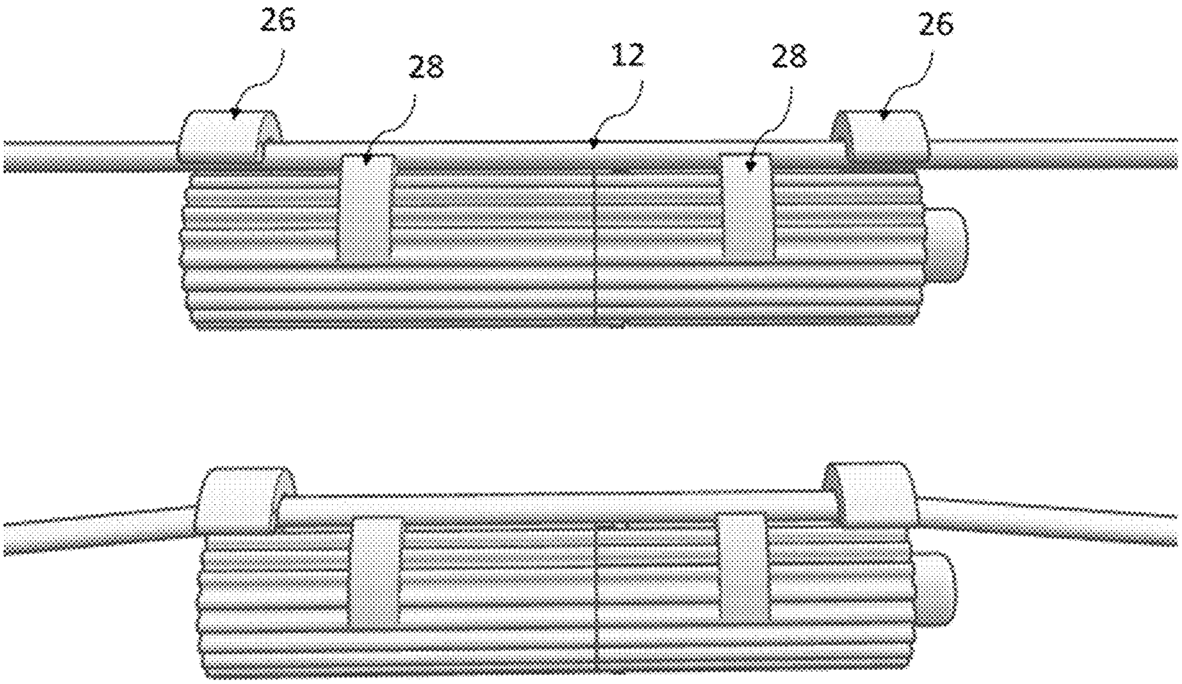
FIG. 4 illustrates a device for increasing visibility of a guy line.

The attachment mechanism locks in place the housing to the guy line. In one embodiment, as shown in FIG. 3, the attachment mechanism may comprise at least one hook portion 26 and a tension mechanism, wherein the tension mechanism comprises at least one offset portion 28. As illustrated in FIG. 4, the attachment mechanism may comprise two hook portions 26 and a tension mechanism, wherein the tension mechanism comprises two offset portions 28, each offset portion located in close proximity to a hook portion 26. In another embodiment, the attachment mechanism may comprise a screw down mechanism. In yet another embodiment, the attachment mechanism may comprise a clamping mechanism, for example, a clip/flip mechanism or clothespin mechanism. In another embodiment, the attachment mechanism may comprise a chemical attachment mechanism, for example, adhesive.

As indicated above, the attachment mechanism may comprise at least one hook portion 26 and a tension mechanism, wherein the tension mechanism comprises at least one offset portion 28. As illustrated in FIG. 4, the hook portion 26 attaches to the guy line 12. The offset portion 28 pushes the guy line 12 into the hook portion 26 providing tension to the guy line locking in place the device to the guy line; thus, preventing the device from sliding down the guy line. In this manner, the device 10 can be held in place at any point along the length of the guy line 12. For example, the device may be located and held in place at the bottom of the guy line near the stake driven into the ground, or the device may be located and held in place at the center of the guy line. Alternatively, multiple devices 10 may be placed along the length of a single guy line to further increase the visibility of the guy line at night.

Figure 5:
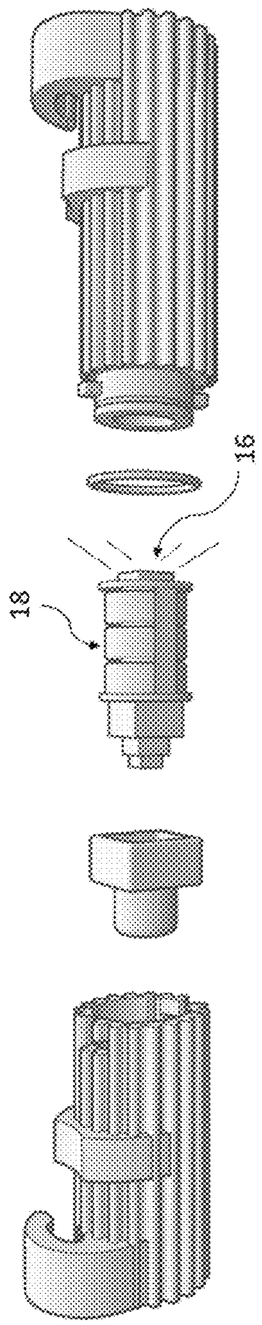
FIG. 5 illustrates a light emitting source in an exploded view of a device for increasing visibility of a guy line.
Figure 6:
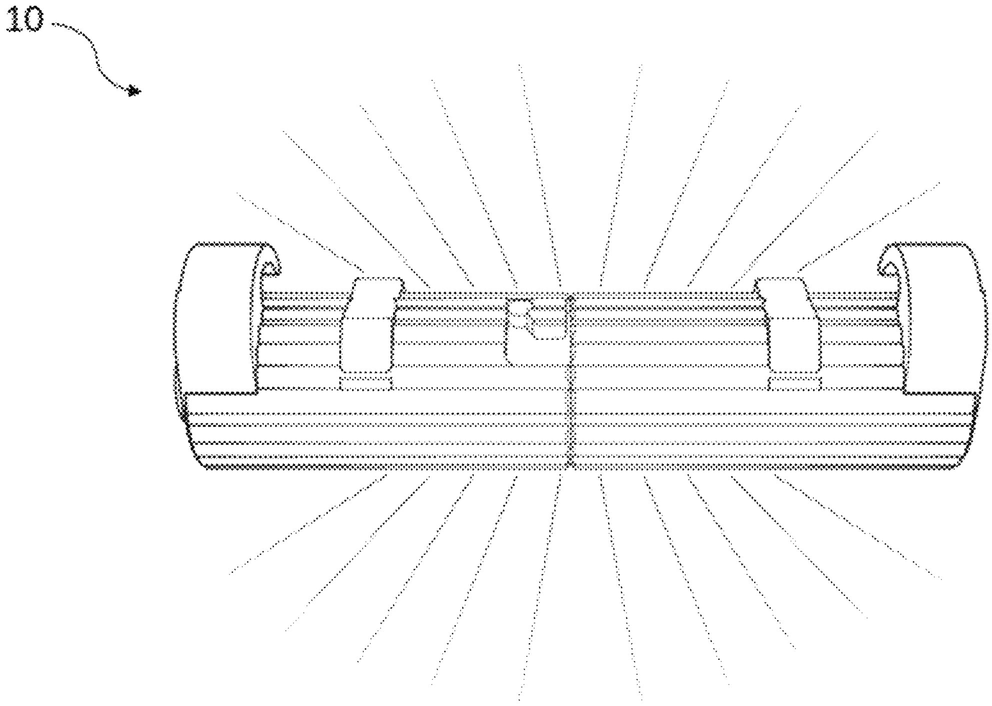
FIG. 6 illustrates an illuminated device for increasing visibility of a guy line.
Figure 7:
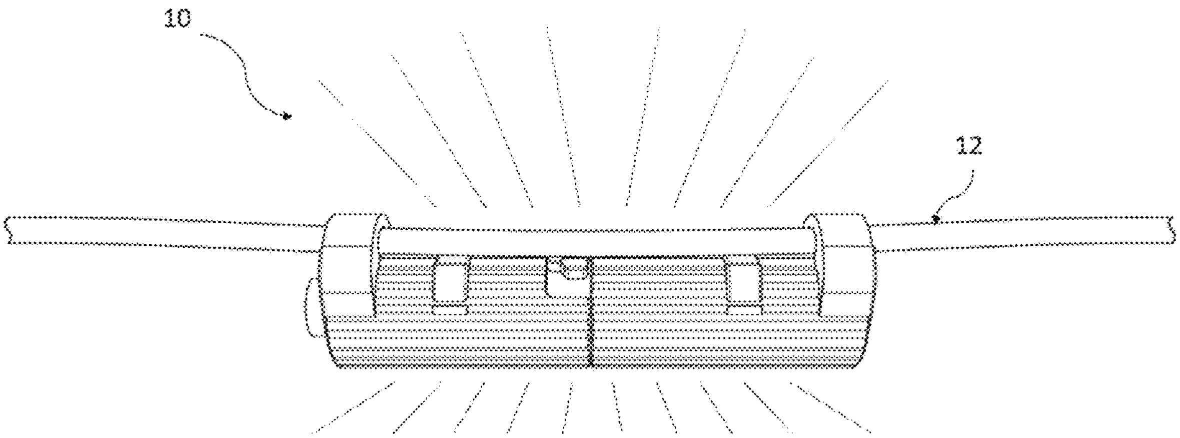
FIG. 7 illustrates an illuminated device for increasing visibility of a guy line.

As shown in the Figures, the device comprises a light emitting source 16, for example a light emitting diode (LED). As illustrated in FIG. 5, the light emitting source 16 is located within the housing 14 and powered by power source 18. As illustrated in FIGS. 5-7, the light emitting source shines light throughout the length of the housing creating an illuminating effect. When the device is placed on a guy line, said illuminating effect draws attention to the presence of the guy line.

In a preferred embodiment, the light emitting source dimly illuminates the housing; therefore, extending the power source life of the device. Furthermore, the dimmed light provides a comfortable amount of light to users. For example, the illuminated device would not pose a bothersome amount of light that would keep campers awake at night or reduce nighttime visibility by blinding the user. Moreover, the dimmed light prevents insects from being attracted to the illuminated device.

As shown in the Figures, housing 14 comprises internal portion 20, external portion 22, and attachment mechanism 24 located on the external portion. The housing may further comprise two removably attached portions, wherein the light emitting source and power source are located on one of the two removably attached portions. Further, the exterior portion of the housing may comprise a ribbed surface 32. The ribbed surface provides for light from the light emitting source to be diffused from the interior portion of the housing to the exterior portion of the housing preventing sharp light points from the illuminated device.

Figure 8:
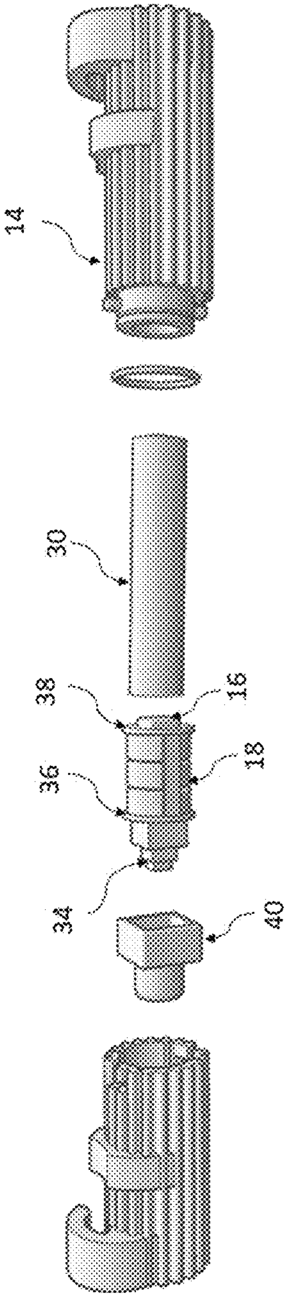
FIG. 8 illustrates an exploded view of a device for increasing visibility of a guy line.
Figure 9:
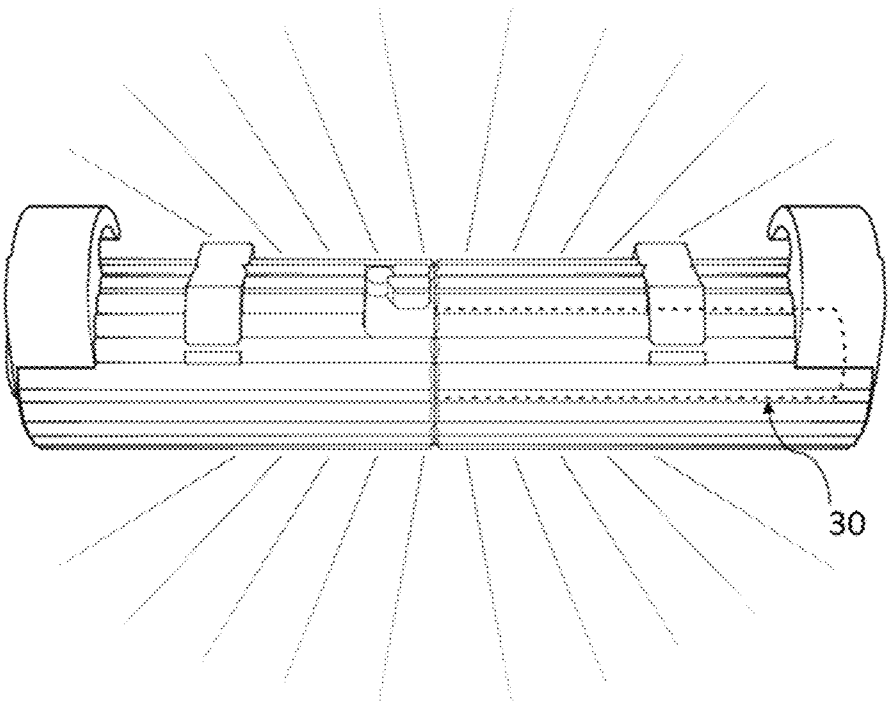
FIG. 9 illustrates an illuminated device for increasing visibility of a guy line.

In another embodiment, the device 10 may further comprise a tubular body within the housing. As illustrated in FIGS. 8-9, tubular body 30 is located within the housing 14 following the light emitting source 16. The tubular body further extends the light from the light emitting source throughout the housing 14. The tubular body may be removably attached to the interior portion of the housing. Further, the tubular body may comprise of malleable plastic material.

As discussed above, housing 14 may further comprise two removably attached portions, wherein the light emitting source and power source are located on one of the two removably attached portions. As illustrated in FIG. 9, in an embodiment wherein the device 10 further comprises tubular body 30, the light emitting source and power source are located on one of the two removably attached portions (not shown) and the tubular body is located on the second of the two removably attached portions (shown in dashed lines).

As claimed, the device 10 comprises in part of power source 18. The power source 18 is located within the housing 14 and powers the light emitting source 16. The power source may comprise a battery, for example, a cell battery. Alternatively, or additionally, the power source may comprise a solar cell battery. In another embodiment, the device 10 may further comprise a light sensor to detect the ambient relative light level. When the light level is below a certain level, the device may automatically turn the light emitting source on. Correspondingly, when the light level is above a certain level, the device may automatically turn the light emitting source off.

The device 10 comprises in part an on/off switch 34. The on/off switch 34 is in contact with the power source 18 providing for the light emitting source to be turn on/off, as desired. In an embodiment, as illustrated in FIG. 8, the on/off switch 34 may be connected to a first electrically conductive PCB 36 located within the housing, said electrically conductive PCB in electrical contact with the power source 18, and a second electrically conductive PCB 38 in electrical contact with the light emitting source 16. When the on/off switch 34 is activated, the circuit is completed. The light emitting source is, in turn, activated and the device 10 is illuminated. The on/off switch may be a self-locking switch. Further, the on/off switch may be covered by a switch cover 40, wherein said cover may be a silicone switch cover.

While this invention has been shown and described with respect to a detailed embodiment thereof, it will be understood by those skilled in the art that changes in form and detail thereof may be made without departing from the scope of the claims of the invention.

What is claimed:

1. A device for increasing visibility of a guy line at night comprising:

a light emitting source located within an elongated housing, wherein the elongated housing is configured to diffuse and extend light generated by the light emitting source throughout the housing; and an attachment mechanism located on an external portion of the elongated housing for securing the housing to a guy line, wherein the attachment mechanism includes at least one hook and a tensioning mechanism adapted to tension the guy line while the housing is secured to the guy line, wherein the at least one hook extends radially from the elongated housing.

2. The device as claimed in claim 1, wherein the light emitting source comprises a light emitting diode.

3. The device as claimed in claim 1, further comprising a power source operable to selectively operate the light emitting source and an off/off switch electrically connected to the power source.

4. The device as claimed in claim 3, wherein the power source comprises a cell battery.

5. The device as claimed in claim 3, wherein the power source comprises a solar cell battery.

6. The device as claimed in claim 3, wherein the on/off switch is connected to a first electrically conductive PCB located within the housing and in electrical contact with the power source.

7. The device as claimed in claim 3, wherein the on/off switch is a self-locking switch.

8. The device as claimed in claim 1, wherein the housing is made out of a translucent plastic material.

9. The device as claimed in claim 1, wherein the external portion of the housing is a ribbed surface facilitating light diffusion.

10. A device for increasing visibility of a guy line at night comprising:

a light emitting source located within an elongated housing, wherein the elongated housing is configured to diffuse and extend light generated by the light emitting source throughout the housing; and an attachment mechanism located on an external portion of the elongated housing for securing the housing to a guy line, wherein the attachment mechanism includes at least one hook and a tensioning mechanism adapted to tension the guy line while the housing is secured to the guy line, wherein the tensioning mechanism comprises at least one offset portion adapted to push a guy line into the at least one hook portion.

11. The device of claim 10, wherein the attachment mechanism extends radially from the elongated housing.

12. The device of claim 10, wherein the external portion of the housing is a ribbed surface facilitating light diffusion.

13. The device of claim 10, wherein the at least one hook includes a first hook and a second hook, wherein the at least one offset portion includes a first offset portion positioned proximately to the first hook and a second offset portion positioned proximately to the second hook, and wherein the first and second hooks and the first and second offset portions are axially aligned along the external portion.

14. A device for increasing visibility of a guy line at night comprising:

a light emitting source located within a tubular body within an elongated housing, wherein the tubular body is configured to extend light generated by the light emitting source throughout the housing; and an attachment mechanism located on an external portion of the elongated housing for securing the housing to a guy line, wherein the attachment mechanism extends radially from the elongated housing.

15. The device as claimed in claim 14, wherein the attachment mechanism secures the elongated housing to the guy line without interrupting the guy line.

16. The device as claimed in claim 14, wherein the housing is further configured to diffuse light generated by the light emitting source.

17. The device as claimed in claim 16, wherein the external portion of the housing is a ribbed surface facilitating light diffusion.

18. The device as claimed in claim 14, further comprising a power source operable to selectively operate the light emitting source.

19. The device as claimed in claim 14, wherein the housing further comprises a two-part elongated body having two removably attached portions.

20. The device as claimed in claim 14, further comprising a power source operable to selectively operate the light emitting source and an off/off switch electrically connected to the power source.

21. The device as claimed in claim 20, wherein the on/off switch is actuatable through a switch cover protruding from within the elongated housing.

* * * * *